(12) United States Patent
Tomida et al.

(10) Patent No.: US 11,392,909 B2
(45) Date of Patent: Jul. 19, 2022

(54) WALLET SYSTEM, MOBILE TERMINAL, AND COMPUTER READABLE RECORDING MEDIUM

(71) Applicant: TOYOTA JIDOSHA KABUSHIKI KAISHA, Toyota (JP)

(72) Inventors: Hiroto Tomida, Shibuya-ku (JP); Tae Sugimura, Miyoshi (JP); Ryuta Yanagisawa, Ichikawa (JP); Takuya Toriu, Tokyo-to (JP); Daisuke Komiyama, Tokyo-to (JP); Zejun Mei, Fujimi (JP); Kazuhiko Yamaguchi, Nagoya (JP); Honami Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/123,362

(22) Filed: Dec. 16, 2020

(65) Prior Publication Data
US 2021/0182813 A1   Jun. 17, 2021

(30) Foreign Application Priority Data

Dec. 17, 2019   (JP) .............................. JP2019-227593

(51) Int. Cl.
G06Q 20/10   (2012.01)
G06Q 20/32   (2012.01)
G06Q 20/36   (2012.01)

(52) U.S. Cl.
CPC ....... *G06Q 20/102* (2013.01); *G06Q 20/3223* (2013.01); *G06Q 20/3263* (2020.05); *G06Q 20/36* (2013.01)

(58) Field of Classification Search
CPC .......................... G06Q 20/3223; G06Q 20/36
See application file for complete search history.

(56) References Cited

U.S. PATENT DOCUMENTS

| 6,032,859 | A | * | 3/2000 | Muehlberger | ........ G07F 7/0866 |
| | | | | | 235/379 |
| 2010/0063928 | A1 | * | 3/2010 | Hart | ..................... G06Q 40/025 |
| | | | | | 705/35 |
| 2016/0358139 | A1 | * | 12/2016 | Keys | ..................... G06Q 20/385 |
| 2017/0161744 | A1 | * | 6/2017 | Gupta | ..................... G06Q 20/10 |

FOREIGN PATENT DOCUMENTS

WO   WO-2021095706 A1 *   5/2021

OTHER PUBLICATIONS

"First in Japan! Launch of smartphone-operated cash-withdrawal service from ticket machines at Tokyu Line train Stations, Apr. 24, 2019, GMO Payment Gateway, entire document" (Year: 2019).*

* cited by examiner

*Primary Examiner* — Hani M Kazimi
*Assistant Examiner* — Adam Hilmantel
(74) *Attorney, Agent, or Firm* — Oliff PLC (57) ABSTRACT

A wallet system includes: a mobile terminal including a first processor including hardware, the first processor being configured to enable a user to determine an amount that is larger than a price of a product in a store as a payment amount, and output, to a server, a payment request for paying the payment amount using electronic money deposited to an electronic wallet; and a store terminal including a display, and a second processor including hardware, the second processor being configured to cause the display to display an amount of change to the user calculated by subtracting the price of the product from the payment amount.

11 Claims, 6 Drawing Sheets

| US 11,392,909 B2 |

WALLET SYSTEM, MOBILE TERMINAL, AND COMPUTER READABLE RECORDING MEDIUM

The present application claim priority to and incorporates by reference the entire contents of Japanese Patent Application No. 2019-227593 filed in Japan on Dec. 17, 2019.

BACKGROUND

The present disclosure relates to a wallet system a mobile terminal, and a computer readable recording medium.

In the related art, a cash-out service enabling withdrawal of cash from a station ticket machine using a smartphone application is known.

SUMMARY

There is a need for a wallet system, a mobile terminal, and a computer readable recording medium that enable cash withdrawal anytime, anywhere, without requiring pre-registration.

According to one aspect of the present disclosure, there is provided a wallet system including: a mobile terminal including a first processor including hardware, the first processor being configured to enable a user to determine an amount that is larger than a price of a product in a store as a payment amount, and output, to a server, a payment request for paying the payment amount using electronic money deposited to an electronic wallet; and a store terminal including a display, and a second processor including hardware, the second processor being configured to cause the display to display an amount of change to the user calculated by subtracting the price of the product from the payment amount.

DETAILED DESCRIPTION

A wallet system, a mobile terminal, and a wallet program according to an embodiment of the present disclosure will be described with reference to the drawings. Note that the components in the following embodiment include components that may be easily replaced by those skilled in the art or components that are substantially the same.

Figure 1:
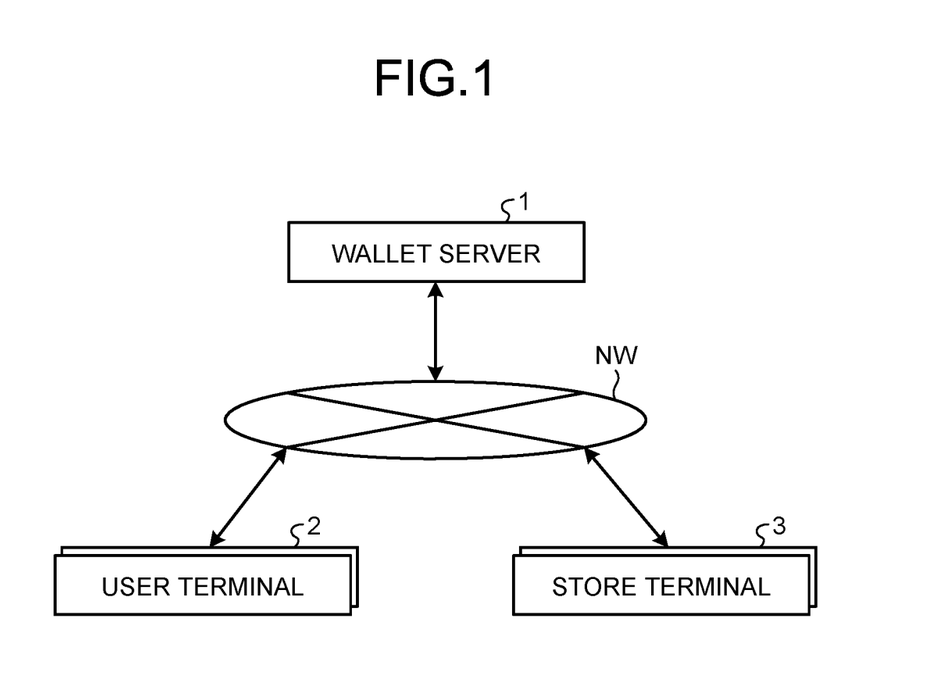
FIG. 1 is a diagram schematically illustrating a configuration of a wallet system according to an embodiment.
Figure 2:
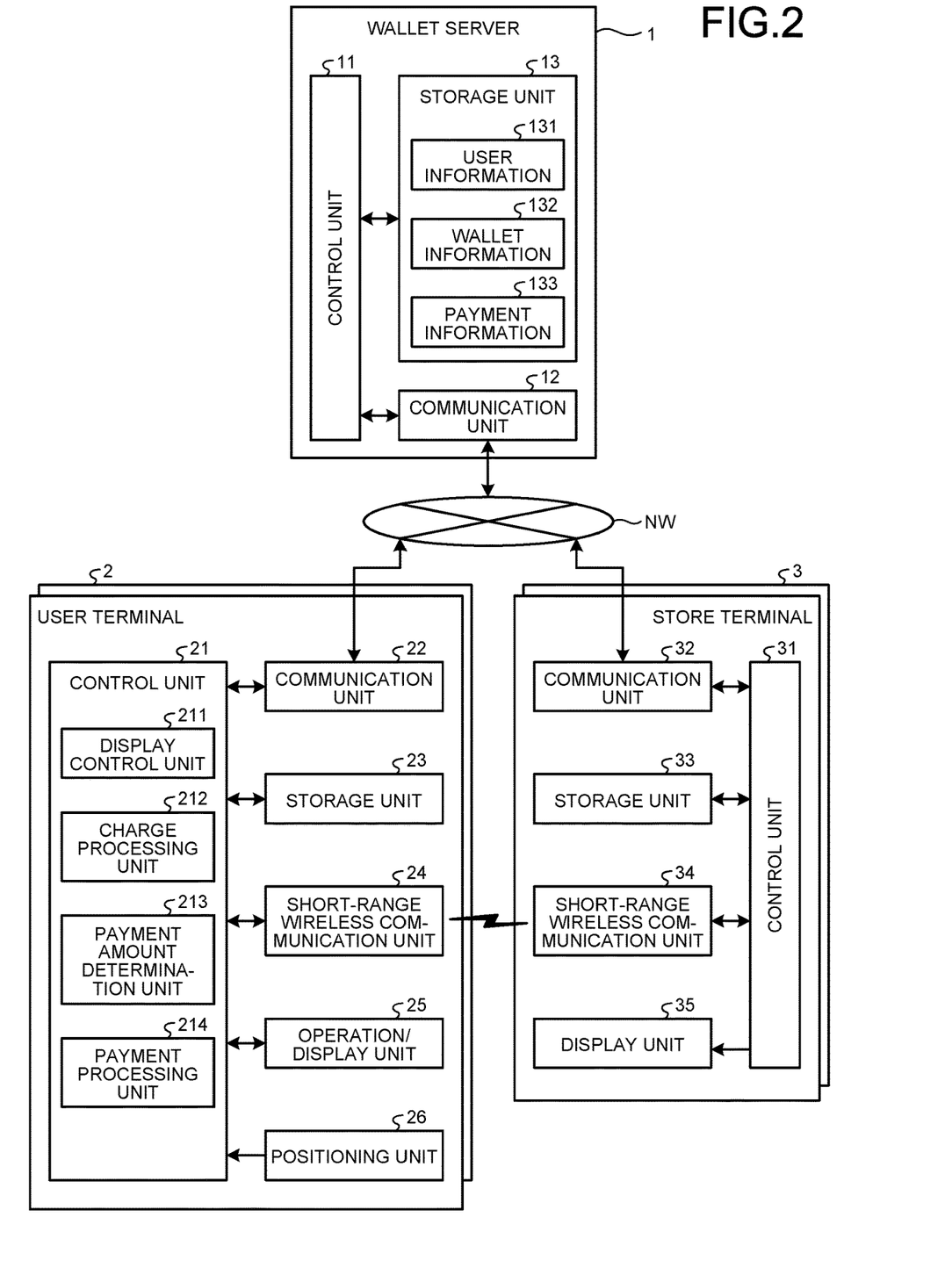
FIG. 2 is a block diagram illustrating details of components of the wallet system according to the embodiment.

A configuration of the wallet system according to the embodiment will be described with reference to FIGS. 1 and 2. As illustrated in FIG. 1, the wallet system includes a wallet server 1, a user terminal 2, and a store terminal 3. In the wallet system the wallet server 1, the user terminal 2, and the store terminal 3 are configured to be able to communicate with each other through a network NW. This network NW includes, for example, an Internet network, a mobile phone network, or the like.

The wallet server 1 is a server for comprehensively managing the wallet system according to the embodiment, and is managed by an administrator (provider) of the wallet system. As illustrated in FIG. 2, the wallet server 1 includes a control unit 11, a communication unit 12, and a storage unit 13.

The control unit 11 includes, specifically, a processor such as a central processing unit (CPU), a digital signal processor (DSP), and a field-programmable gate array (FPGA), and a memory (main storage unit) such as a random access memory (RAM) and a read only memory (ROM). The control unit 11 loads and executes a program stored in the storage unit 13 on a work area of the main storage unit, and controls each constituent unit through execution of the program thereby implementing a function that meets a predetermined purpose.

The communication unit 12 includes, for example, a local area network (LAN) interface board, a wireless communication circuit for wireless communication, and the like. The communication unit 12 is connected to the network NW such as the Internet, which is a public communication network. Then, the communication unit 12 is connected to the network NW to communicate with the user terminal 2 and the store terminal 3.

The storage unit 13 includes a recording medium such as an erasable programmable ROM (EPROM), a hard disk drive (HDD), and a removable medium Examples of the removable media include a universal serial bus (USB) memory, and disc recording media such as a compact disc (CD), a digital versatile disc (DVD), and a Blu-ray (registered trademark) disc (BD). The storage unit 13 may store an operating system (OS), various programs, various tables, various databases, and the like. The storage unit 13 also stores user information 131, wallet information 132, and payment information 133 for each user of the wallet system. The user information 131 is information about a user who uses the wallet system Examples of the user information 131 include the user ID of a user who has registered as a user of the wallet system) password, the name of the user, contact information (such as an address, phone number, and e-mail address) about the user, the extra amount set in advance by the user, and the like. The user ID and the password in the user information 131 are used for authentication processing such as login to the wallet server 1.

The "extra amount set in advance by the user" refers to an extra amount to be added to the price of a product (hereinafter referred to as "product price") to be purchased by the user in a store. In the wallet system according to the embodiment, a price obtained by adding the extra amount to an actual product price is set as a payment amount, and the payment amount is paid. Thus, the user may receive cash corresponding to the extra amount as change.

The wallet information 132 is information about a wallet (electronic wallet) of the wallet system. The wallet is a virtual deposit/withdrawal account for electronic money. Examples of the wallet information 132 include a user ID, electronic money balance, electronic money charge history, electronic money usage history, and the like.

The payment information 133 is information about payment in the wallet system. The payment information 133 includes a user ID, payment methods employed for payment (such as, for example, electronic money payment (contactless payment), scan payment, and code payment), payment history, and the like.

The user terminal 2 is a mobile terminal used by the user. Examples of the user terminal 2 include a smartphone, a mobile phone, a tablet terminal, a wearable computer, and the like owned by the user.

The user terminal 2 includes a control unit (first processor) 21, a communication unit 22, a storage unit 23, a short-range wireless communication unit 24, and an operation/display unit (display) 25. The control unit 21, the communication unit 22, and the storage unit 23 are physically the same as the control unit 11, the communication unit 12, and the storage unit 13. The control unit 21 functions as a display control unit 211, a charge processing unit 212, a payment amount determination unit 213, and a payment processing unit 214 through execution of a program.

The display control unit 211 controls display contents on the operation/display unit 25. Based on a user's operation (such as a touch operation or a flick operation), the display control unit 211 causes the operation/display unit 25 to display a membership registration screen for the user to perform membership registration, a login screen for logging into the wallet system a charge screen for charging (depositing) electronic money to the wallet, a payment screen for making a payment, and the like.

Furthermore, upon acquiring information on the extra amount from the store terminal 3, the display control unit 211 causes the operation/display unit 25 to display the extra amount. This enables the user to check the amount of cash (change) the user may receive at the store.

The charge processing unit 212 charges the wallet with electronic money. The charge processing unit 212 outputs, to the wallet server 1, a charge request for charging the wallet w t h electronic money using charging means set in advance. The "charging means" is means to deposit electronic money into a wallet, which is a virtual deposit/withdrawal account. Examples of the charging naans include a bank account, a credit card, and the like.

Upon receiving the charge request from the charge processing unit 212, the control unit 11 of the wallet server 1 increases the balance of the electronic money in the wallet, based on charge amount information included in the charge request. That is, the control unit 11 updates the wallet information 132 stored in the storage unit 13 based on the increase in the balance of electronic money in the wallet.

The payment amount determination unit 213 determines the payment amount the user makes when purchasing a product in a store. In the wallet system according to the embodiment, a user pays a payment amount as a result of adding a predetermined amount to a product price, instead of directly paying the product price, when the user purchases a product in a store. Thus, the payment amount determination unit 213 determines the payment amount that is larger than the product price. Specifically, the payment amount determination unit 213 may determine the payment amount by any of the following methods (1) to (4).

(1) An extra amount determined in advance by the user is added to the product price.

(2) An extra amount determined in advance by the store is added to the product price.

(3) When the extra amount obtained in (2) is smaller than the extra amount desired by the user (hereinafter, referred to as "desired extra amount"), the desired extra amount and a fee determined in advance by the store are added to the product price.

(4) The extra amount is calculated based on the balance of cash in a cash register in the store, and the extra amount is added to the product price.

In the cases of (2) and (3), the control unit 21 of the user terminal 2 outputs position information on the user terminal 2 detected by a positioning unit 26 to the store terminal 3. In response to this, a control unit 31 of the store terminal 3 outputs information on the extra amount to the user terminal 2 when the user enters the store (when entrance of the user to the store is detected). In the case of (4), the control unit 21 outputs the position information on the user terminal 2 detected by the positioning unit 26 to the store terminal 3. In response to this, the control unit 31 outputs information on the cash balance in the cash register to the user terminal 2 when the user enters the store.

The payment processing unit 214 performs payment using the electronic money charged in the wallet. The payment processing unit 214 makes payment using any of a plurality of payment methods. Examples of the payment methods include contactless payment, scan payment, and code payment. The contactless payment is payment made in a contactless manner, between the short-range wireless communication unit 24 of the user terminal 2 and the short-range wireless communication unit 34 of the store terminal 3, when the user terminal 2 is held over the store terminal 3. The scan payment is payment made by reading a barcode or a QR Code (registered trademark) displayed on the store terminal 3 with a camera or the like of the user terminal 2. The code payment is payment made by reading a barcode or a QR Code (registered trademark) displayed on the user terminal 2 with a code reader or the like of the store terminal 3.

The payment processing unit 214 outputs a payment request to the store terminal 3, for paying the payment amount determined by the payment amount determination unit 213 using electronic money charged in the wallet by means of any one of a plurality of payment methods (electronic money payment, scan payment, and code payment) set in advance. The payment request output from the payment processing unit 214 to the store terminal 3 includes information indicating the payment amount (hereinafter referred to as "payment amount information").

Then, the control unit 31 of the store terminal 3 outputs the payment request including the payment amount information to the wallet server 1 through the network NW Upon receiving the payment request from the store terminal 3, the control unit 11 of the wallet server 1 reduces the balance of the electronic money in the wallet based on the payment amount information included in the payment request. That is, the control unit 11 updates the wallet information 132 and the payment information 133 stored in the storage unit 13 based on the reduction in the balance of electronic money in the wallet. Then, the control unit 11 outputs the updated wallet information 132 and the updated payment information 133 to the user terminal 2. Furthermore, the control unit 11 outputs information indicating that the payment is completed (hereinafter referred to as "payment completion information") to the store terminal 3.

The storage unit 23 stores data on various screens to be displayed on the operation/display unit 25 by the display control unit 211. Furthermore, the storage unit 23 temporarily stores the user information 131, the wallet information 132, the payment information 133, the current position of the user terminal 2 acquired by the positioning unit 26, and the like, as appropriate.

The short-range wireless communication unit 24 has a communication function based on standards such as Near field radio communication (NFC), Bluetooth (registered trademark) Low Energy (BLE), and Infrared Data Association (IrDA). The user terminal 2 performs short-range wireless communications with the store terminal 3 using the short-range wireless communication unit 24 when making payment using electronic money, for example.

The operation/display unit 25 is configured by, for example, a touch panel display, and has an input function of receiving an operation using a user's finger, a pen, and the like, and a display function of displaying various kinds of information under the control of the display control unit 211.

The positioning unit 26 receives radio waves from a global positioning system (GPS) satellite and detects position information on the user terminal 2. Then, the control unit 21 outputs the position information on the user terminal 2 to the store terminal 3 through the network NW.

The store terminal 3 is provided, for example, in a store (member store) in which the wallet system according to the present embodiment is available. The store terminal 3 includes the control unit 31, a communication unit 32, a storage unit 33, a short-range wireless communication unit 34, and a display unit 35. The control unit 31, the communication unit 32, the storage unit 33, and the short-range wireless communication unit 34 are physically the same as the control unit 11, the communication unit 12, the storage unit 13, and the short-range wireless communication unit 24. The display unit 35 includes, for example, a liquid crystal display (LCD), an organic EL display (OLED), and the like, and displays information under the control of the control unit 31.

Upon acquiring the payment completion information from the wallet server 1 at the time of payment by the user terminal 2, the control unit 31 subtracts the actual product price from the payment amount determined by the user terminal 2 to calculate the amount of change received by the user (hereinafter, referred to as "change amount"). Then, the control unit 31 causes the display unit 35 to display the calculated change amount. This enables the user to check the amount of cash (change) the user may receive at the store.

Figure 3:
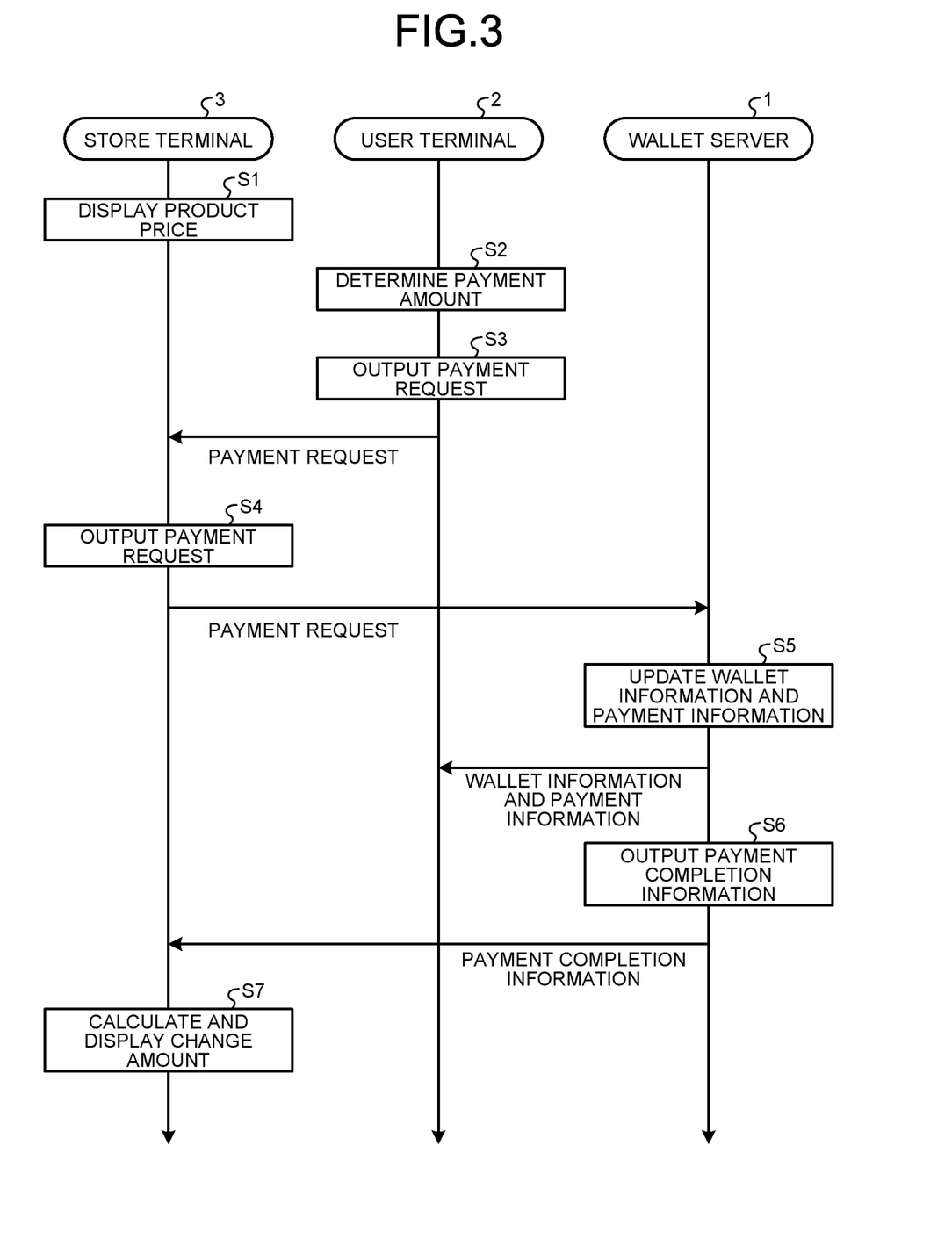
FIG. 3 is a flowchart illustrating an example of a cash-out method performed by the wallet system according to the embodiment.

Hereinafter, an example of a cash-out method performed by the wallet system according to the embodiment will be described with reference to FIG. 3. The processing in the flowchart in FIG. 3 is assumed to start when the user who has entered a store hands a product to a cashier at the cash register and then information on the product to be purchased is input to the cash register.

First of all, the control unit 31 of the store terminal 3 makes the display unit 35 display the product price (Step S1). Then, the payment amount determination unit 213 of the user terminal 2 determines the payment amount that is larger than the product price (Step S2). In Step S2, the payment amount determination unit 213 determines the payment amount by, for example, adding an extra amount determined in advance by the user, to the product price. Note that other methods for determining the payment amount will be described separately (see FIGS. 4 to 6).

Then, the payment processing unit 214 outputs a payment request for paying the payment amount determined in Step S2 with the electronic money charged in the wallet, to the store terminal 3 (Step S3). Then, the control unit 31 outputs the payment request acquired from the user terminal 2 to the wallet server 1 (Step S4).

Then, the control unit 11 of the wallet server 1 updates the wallet information 132 and the payment information 133 stored in the storage unit 13 based on the payment amount (Step S5), and outputs the updated wallet information 132 and the updated payment information 133 to the user terminal 2. Then, the control unit 11 outputs the payment completion information to the store terminal 3 (Step S6).

Then, the control unit 31 calculates the change amount by subtracting the actual product price from the payment amount determined in Step S2, and causes the display unit 35 to display the calculated change amount (Step S7). Through the processing described above, the user may receive cash corresponding to the extra amount added to the product price, as change.

Other examples of the method of determining the payment amount in Step S2 of FIG. 3 will be described with reference to FIGS. 4 to 6.

Figure 4:
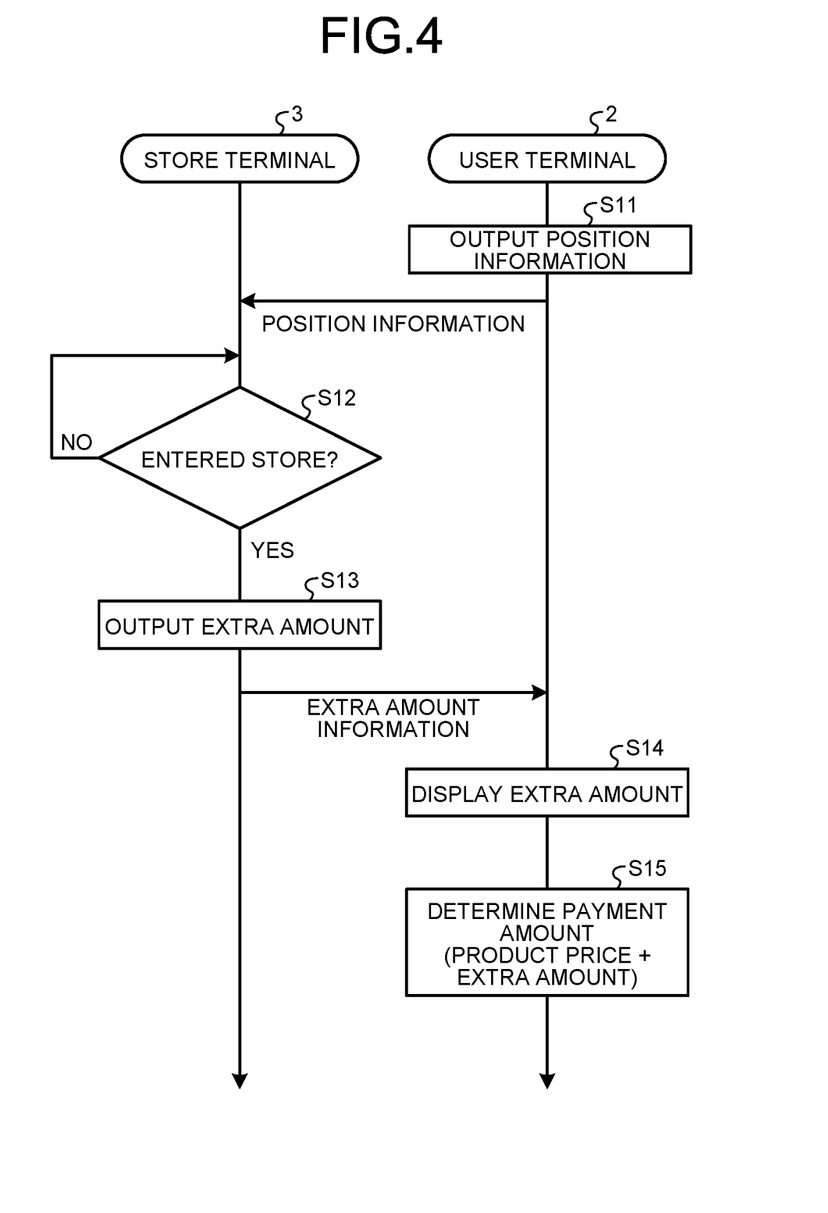
FIG. 4 is a flowchart illustrating an example of a payment amount determination method in the cash-out method performed by the wallet system according to the embodiment.

FIG. 4 illustrates an example in which the payment amount is determined based on an extra amount determined in advance by the store. In this case, the control unit 21 first outputs the position information on the user terminal 2 to the store terminal 3 (Step S11). Then, upon detecting that the user has entered the store based on the position information on the user terminal 2 (Yes in Step S12), the control unit 31 outputs the information on the predetermined extra amount to the user terminal 2 (Step S13). Note that the extra amount is set differently among stores. In other words, the extra amount is the amount of cash to be given to the user as change. Therefore, the extra amount is set in consideration of, for example, the amount of cash (change) the store expects to be constantly prepared in the cash register, and the like.

Then, the display control unit 211 causes the operation/display unit 25 to display the extra amount (Step S14). With the extra amount thus displayed on the operation/display unit 25, the user may check the amount of cash (change) that may be received at the store.

Then, the payment amount determination unit 213 determines the payment amount by adding the extra amount to the product price (Step S15). With the payment amount thus determined by adding the extra amount to the product price and the payment made based on the payment amount, the user nay receive cash corresponding to the extra amount added to the product price as change.

Figure 5:
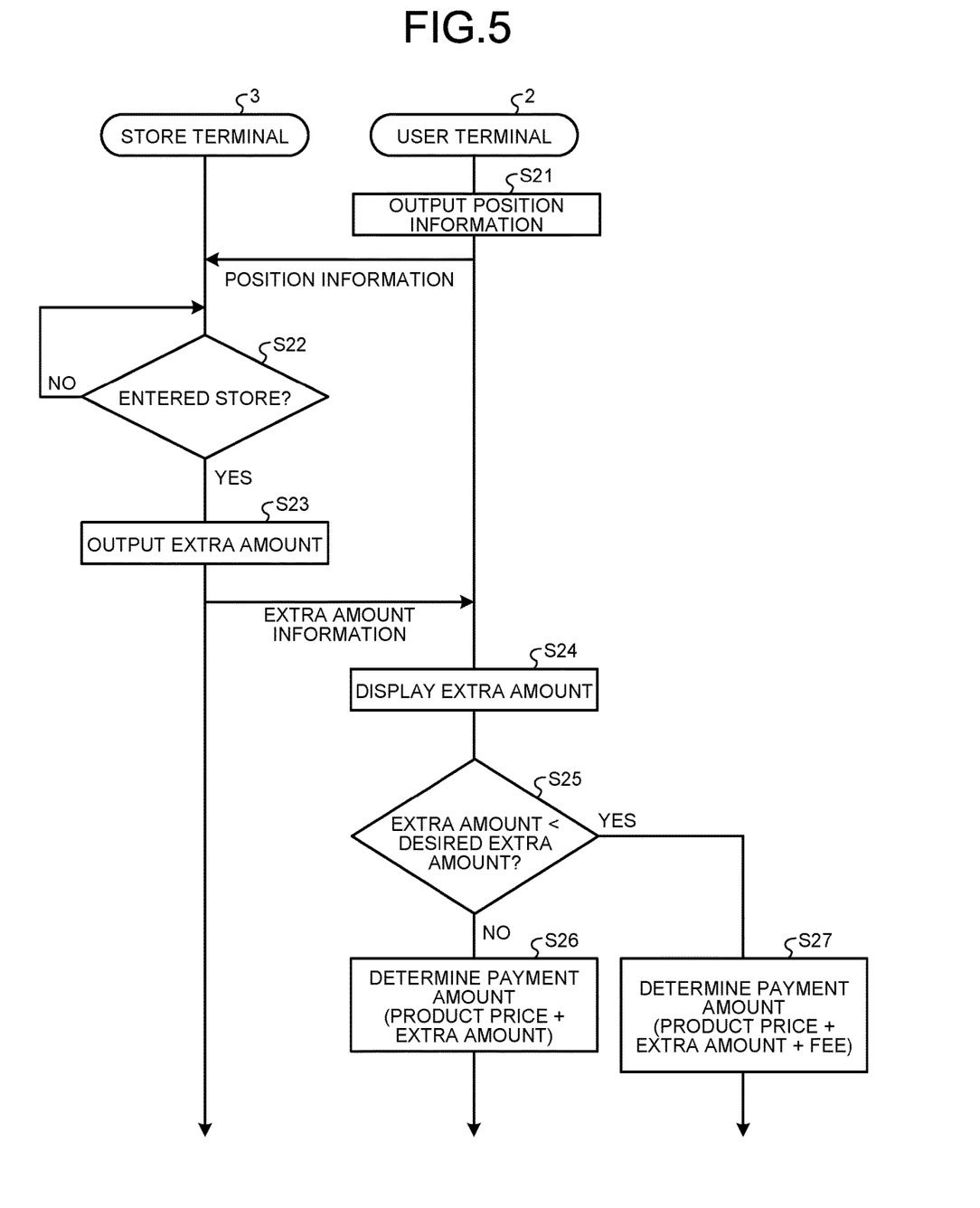
FIG. 5 is a flowchart illustrating an example of a payment amount determination method in the cash-out method performed by the wallet system according to the embodiment.

FIG. 5 illustrates an example where the user disagrees with the extra amount set in advance by the store, and the payment amount is determined based on a desired extra amount set by the user. In this case, the control unit 21 first outputs the position information on the user terminal 2 to the store terminal 3 (Step S21). Then, upon detecting that the user has entered the store based on the position information on the user terminal 2 (Yes in Step S22), the control unit 31 outputs the information on the predetermined extra amount to the user terminal 2 (Step S23).

Then, the display control unit 211 causes the operation/display unit 25 to display the extra amount (Step S24). With the extra amount thus displayed on the operation/display unit 25, the user may check the amount of cash (change) that may be received at the store.

Then, the payment amount determination unit 213 determines whether the extra amount set by the store is smaller than the desired extra amount, which is the extra amount desired by the user (Step S25). The expression "the extra amount is smaller than the desired extra amount" indicates that the user wants a larger extra amount to be added to the product price, that is, a larger amount of cash. Note that, for example, the determination in Step S25 may be made by using methods such as a method including: the display control unit 211 causing the operation/display unit 25 to display a selection button for agreeing or disagreeing with the extra amount set on the store side, a screen for inputting the desired extra amount, and the like; and allowing the user to directly input the desired extra amount desired by the user.

When it is determined that the extra amount is larger than the desired extra amount desired by the user (No in Step S25), the payment amount determination unit 213 determines the payment amount by adding the extra amount to the product price (Step S26). On the other hand, when it is determined that the extra amount is smaller than the desired extra amount desired by the user (Yes in Step S25), the payment amount determination unit 213 determines the payment amount by adding the desired extra amount and a fee set in advance by the store to the product price (Step S27). The fee may be set to be the same or different among stores. With the payment amount thus determined by adding the extra amount or the desired extra amount to the product price and the payment made based on the payment amount, the user may receive cash corresponding to the extra amount added to the product price as change.

Figure 6:
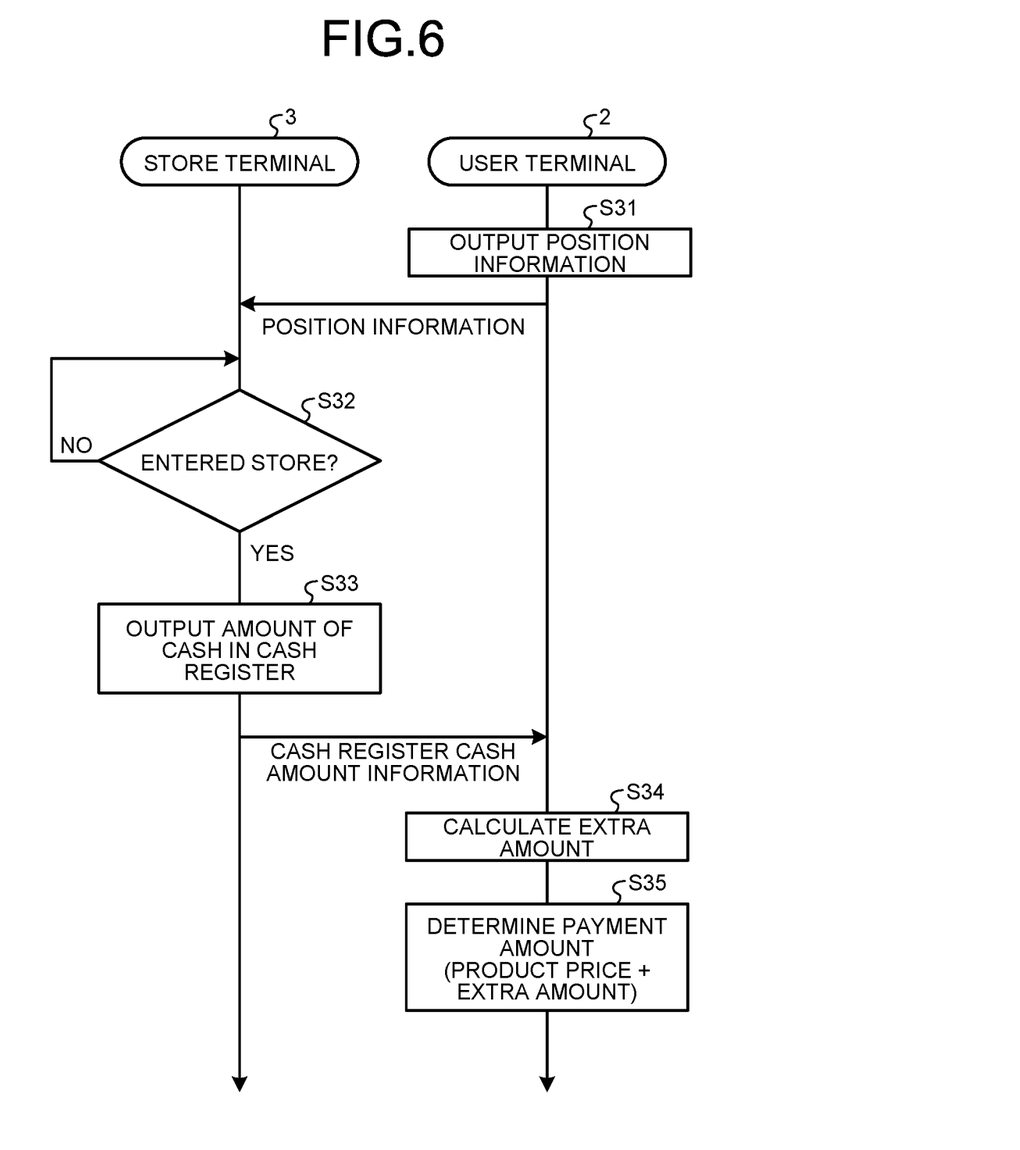
FIG. 6 is a flowchart illustrating an example of a payment amount determination method in the cash-out method performed by the wallet system according to the embodiment.

FIG. 6 illustrates an example where the payment amount is determined based on the amount of cash (cash balance) in a cash register in a store. In this case, the control unit 21 first outputs the position information on the user terminal 2 to the store terminal 3 (Step S31). Then, upon detecting that the user has entered the store based on the position information on the user terminal 2 (Yes in Step S32), the control unit 31 outputs information on the amount of cash in the cash register to the user terminal 2 (Step S33).

Then, the payment amount determination unit 213 calculates the extra amount based on the amount of cash in the cash register (Step S34). In Step S34, the payment amount determination unit 213 calculates the extra amount while taking into consideration the amount of cash (change) that needs to be constantly prepared in the cash register, for example.

Then, the payment amount determination unit 213 determines the payment amount by adding the extra amount to the product price (Step S35). With the payment amount thus determined by adding the extra amount to the product price and the payment made based on the payment amount, the user may receive cash corresponding to the extra amount added to the product price as change.

As described above, with the wallet system the mobile terminal, and the wallet program according to the embodiment, in a store (member store) in which the wallet system is available, payment is made with an extra amount added to an actual product price. Thus, the user may receive cash corresponding to the extra amount as change. Thus, the wallet system the mobile terminal, and the wallet program according to the embodiment enable cash to be withdrawn anytime, anywhere, without requiring pre-registration.

Further effects and modifications may be easily derived by those skilled in the art. Accordingly, broader aspects of the present disclosure are not limited by the specific details and representative embodiment that are illustrated and described above. Therefore, various modifications may be made without departing from the sprit and scope of the general concept of the disclosure defined by the accompanying claims and the equivalent thereof.

For example, with the wallet system the mobile terminal, and the wallet program according to the embodiment, the display control unit 211 may cause the operation/display unit 25 to display the extra amount, as illustrated in Step S14 in FIG. 4, as well as a selection button for agreeing or disagreeing with the extra amount. In this case, the processing may proceed to Step S15, when the user selects the selection button for agreeing with the extra amount.

The present disclosure enables cash withdrawal anytime, anywhere, without requiring pre-registration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wallet system comprising:
   a mobile terminal including:
     a Global Positioning System (GPS) device configured to detect a position of the mobile terminal; and
     a first processor including hardware, the first processor being configured to:
       determine an amount that is larger than a price of a product in a store as a payment amount, the payment amount being determined by adding an extra amount set in advance by the store to the price of the product, the extra amount being acquired from the store upon the GPS device detecting that the mobile terminal has entered a location of the store, and
       in response to the GPS device detecting that the mobile terminal has entered the location of the store, output, to a server, a payment request for paying the payment amount using electronic money deposited to an electronic wallet; and
   a store terminal located in the store, the store terminal including:
     a display, and
     a second processor including hardware, the second processor being configured to cause the display to display an amount of change to the user calculated by subtracting the price of the product from the payment amount.

2. The wallet system according to claim 1, wherein the first processor is configured to determine the payment amount by adding both a desired extra amount set by the user and the extra amount acquired from the store to the price of the product when the extra amount acquired from the store is smaller than the desired extra amount set by the user.

3. The wallet system according to claim 1, wherein:
   the mobile terminal includes a display, and the first processor is configured to cause the display of the mobile terminal to display the extra amount acquired from the store.

4. A wallet system comprising:
   a mobile terminal including:
     a Global Positioning System (GPS) device configured to detect a position of the mobile terminal; and
     a first processor including hardware, the first processor being configured to:
       acquire cash balance in a cash register in a store upon detecting entrance of a user to the store;
       calculate an extra amount based on the cash balance,
       determine an amount that is larger than a price of a product in the store as a payment amount by adding the extra amount to the price of the product, and
       in response to the GPS device detecting that the mobile terminal has entered a location of the store, output, to a server, a payment request for paying the payment amount using electronic money deposited to an electronic wallet; and a store terminal located in the store, the store terminal including:
a display, and
a second processor including hardware, the second processor being configured to cause the display to display an amount of change to the user calculated by subtracting the price of the product from the payment amount.

5. A mobile terminal comprising:
a Global Positioning System (GPS) device configured to detect a position of the mobile terminal; and
a processor including hardware, the processor being configured to:
acquire an extra amount from a store terminal located in a store upon the GPS device detecting that the mobile terminal has entered a location of the store;
determine an amount larger than a price of a product in a store as a payment amount, the payment amount being determined by adding the extra amount set in advance by the store to the price of the product; and
in response to the GPS device detecting that the mobile terminal has entered the location of the store, output, to a server, a payment request for paying the payment amount with electronic money deposited in an electronic wallet.

6. The mobile terminal according to claim 5, wherein the processor is configured to determine the payment amount by adding both a desired extra amount set by the user and the amount acquired from the store to the price of the product when the extra amount set in advance by the store is smaller than the desired extra amount set by the user.

7. The mobile terminal according to claim 5, further comprising a display, wherein
the processor is configured to cause the display of the mobile terminal to display the extra amount acquired from the store terminal.

8. The mobile terminal according to claim 5, wherein the processor is configured to:
acquire cash balance in a cash register in the store from a-the store terminal provided to the store upon the GPS device detecting entrance of the user to the store;
calculate the extra amount based on the cash balance; and
determine the payment amount by adding the extra amount to the price of the product.

9. A non-transitory computer-readable recording medium on which an executable program is recorded, the program causing a processor of a mobile terminal to execute processes, the mobile terminal including a Global Positioning System (GPS) device configured to detect a position of the mobile terminal, the processes executing by the processor comprising:
acquiring an extra amount from a store terminal located in a store upon the GPS device detecting that the mobile terminal has entered a location of the store;
determining an amount larger than a price of a product in a store as a payment amount, the payment amount being determined by adding the extra amount set in advance by the store to the price of the product; and
in response to the GPS device detecting that the mobile terminal has entered the location of the store, outputting, to a server, a payment request for paying the payment amount with electronic money deposited in an electronic wallet.

10. The non-transitory computer-readable recording medium according to claim 9, wherein the program causes the processor to execute determining the payment amount by adding both a desired extra amount set by the user and the extra amount acquired from the store to the price of the product when the extra amount set in advance by the store is smaller than the desired extra amount desired by the user.

11. The non-transitory computer-readable recording medium according to claim 9, wherein the program causes the processor to execute
causing a display included in the mobile terminal to display the extra amount acquired from the store terminal.

* * * * *